United States Patent
Lin et al.

(10) Patent No.: US 9,876,943 B2
(45) Date of Patent: Jan. 23, 2018

(54) COLOR MANAGED PRINTING SYSTEM

(71) Applicant: XEROX CORPORATION, Norwalk, CT (US)

(72) Inventors: Guo-Yau Lin, The Woodlands, TX (US); J. Michael Sanchez, Rochester, NY (US)

(73) Assignee: XEROX CORPORATION, Norwalk, CT (US)

( * ) Notice: Subject to any disclaimer, the term of this patent is extended or adjusted under 35 U.S.C. 154(b) by 41 days.

(21) Appl. No.: 14/458,013

(22) Filed: Aug. 12, 2014

(65) Prior Publication Data

US 2016/0048746 A1    Feb. 18, 2016

(51) Int. Cl.
*G06F 15/00* (2006.01)
*H04N 1/60* (2006.01)

(52) U.S. Cl.
CPC .................................. *H04N 1/603* (2013.01)

(58) Field of Classification Search
CPC ............................. H04N 1/603; G06K 15/02
USPC ........................................................ 358/1.9
See application file for complete search history.

(56) References Cited

U.S. PATENT DOCUMENTS

| | | | |
|---|---|---|---|
| 7,864,387 B2 | 1/2011 | Chen et al. | |
| 8,274,706 B2 | 9/2012 | Monga et al. | |
| 8,339,690 B2 | 12/2012 | Sivan et al. | |
| 2007/0177231 A1* | 8/2007 | Wang et al. | 358/504 |
| 2012/0133991 A1* | 5/2012 | Monga et al. | 358/3.06 |
| 2014/0139883 A1* | 5/2014 | Hashizume | H04N 1/00015 358/3.06 |

* cited by examiner

*Primary Examiner* — Neil R McLean
(74) *Attorney, Agent, or Firm* — MH2 Technology Law Group LLP

(57) ABSTRACT

A system and method for color management of a color printer for correcting color drift using a single unified calibration tone reproduction curve (TRC). The unified calibration TRC may be applied to destination profiles for all halftones during printing. When printer drift occurs, only the unified calibration TRC is recalibrated to create a new unified calibration TRC which is subsequently applied to the destination profiles for all color halftones during printing to correct the color output of the color printer.

14 Claims, 6 Drawing Sheets

COLOR MANAGED PRINTING SYSTEM

TECHNICAL FIELD

The present teachings are directed to color management for electrostatographic printers and, more particularly, to a printer method and structure for simplifying the management and correction of printed colors.

BACKGROUND

In today's business and scientific world, color is essential as a component of communication. Color facilitates the sharing of knowledge, and as a result companies involved in the development of digital color print engines are continuously seeking to improve the image quality of such products. One of the elements that affects image quality is the ability to produce accurate and consistent colors on a printer over time.

Color profiling, color calibration, and software/firmware manipulation of printer color output, for example a printer using a cyan, magenta, yellow, black (CMYK) color model (i.e., color pallet), is typically required to produce an accurate or desired color output. For profiling, the color to be profiled may be printed using a color step wedge or color gradient that represents a plurality of halftones, and ranges from an input of "0" which is intended to print no halftone dots over the area to be printed to an input of "255" (in an 8-bit system) that is intended to print a solid color over the print area. FIG. 1 is a graph 10 that represents a color tone response characteristic for a single color separation. If left uncorrected, a 0-255 color input will typically result an output that has an "S" shaped curve 12 that will produce incorrect colors over at least part of the 0-255 input when printed in combination with other colors. In one common method to correct or calibrate the color output, the halftone separation curve 12 is linearized by evaluating some or all of the halftone values from 0-255 and correcting output values to provide a linear color curve 14. For example, a digital input print value of 65 for a particular halftone may output an uncorrected digital output print value of, for example, 60 as depicted in FIG. 1. A digital translation is provided for each value in, for example, a lookup table. After profiling and correction, the digital input of 65 is corrected using the lookup table value to provide a corrected digital output print value of 65. Each color from a printer color pallet (e.g., CMYK) is separately evaluated to produce a different tone reproduction curve (TRC) for each color that linearizes the output for each color. The TRC for each color is stored in software or firmware and used during raster image processing (RIP) of the source material and printing of each color to result in a desired color output. The TRC thus corrects each halftone input from 0-255 with a customized output for each halftone for each color.

Colors on a printer tend to drift due to various factors such as color or viscosity variations in ink or toner, fluctuations in environmental conditions such as temperature and humidity, differences in the type of print media used, etc. When the drift is small, a print system may use a calibration procedure on each color halftone to correct the drift to achieve color consistency. This calibration to correct for small drift can be performed by re-calibrating each TRC for each color halftone.

For more significant drift where a larger separation interaction occurs, a new destination profile must be created for each halftone after calibration. To create a new destination profile, device-dependent color data from the printer is translated into a device-independent profile connection space (PCS) in accordance with international color consortium (ICC) specifications, for example using a lookup table. Translation may be performed by a color management module (CMM). Once the color values of the source device have been converted to PCS, the CMM may transform the color values from the PCS to a different device-dependent color space or destination profile, wherein each halftone includes a different destination profile.

Although profiling and calibration results in a high quality colorimetric print, running calibration and profiling multiple times leads to printer downtime and may be labor intensive in printers requiring manual calibration and profiling. For each color, the digital input must be compared with the digital output to create a new destination profile for each color. Further, it is difficult to track whether a specific halftone has up-to-date calibration before running a profiling procedure, particularly if the user intends to run only a subset of halftones. Some digital front ends (DFE) do not provide auto-switching mechanism and, in this case, the user is responsible for tracking which halftone is intended for the calibration and which profile should be associated therewith.

A simplified method for profiling and/or calibration of color printers would be desirable.

SUMMARY

The following presents a simplified summary in order to provide a basic understanding of some aspects of one or more embodiments of the present teachings. This summary is not an extensive overview, nor is it intended to identify key or critical elements of the present teachings, nor to delineate the scope of the disclosure. Rather, its primary purpose is merely to present one or more concepts in simplified form as a prelude to the detailed description presented later.

In an embodiment, a method for color management for a color printer may include receiving a unified calibration tone reproduction curve (TRC) that comprises a translation which converts a plurality of digital input values to a plurality of corrected digital output values, applying the unified calibration TRC to a first destination profile for a first color halftone to color correct the first color halftone, and applying the unified calibration TRC to a second destination profile for a second color halftone that is different than the first color halftone to color correct the first color halftone.

In another embodiment, a non-transitory computer readable storage medium includes a program stored thereon to provide a color management system for correcting a color output for a color printer, wherein the program, when executed by the computer, performs a method including receiving a unified calibration tone reproduction curve (TRC) that comprises a translation which converts a plurality of digital input values to a plurality of corrected digital output values, applying the unified calibration TRC to a first destination profile for a first color halftone to color correct the first color halftone, and applying the unified calibration TRC to a second destination profile for a second color halftone that is different than the first color halftone to color correct the first color halftone.

BRIEF DESCRIPTION OF THE DRAWINGS

The accompanying drawings, which are incorporated in and constitute a part of this specification, illustrate embodiments of the present teachings and together with the description, serve to explain the principles of the disclosure. In the figures.

Figure 1:
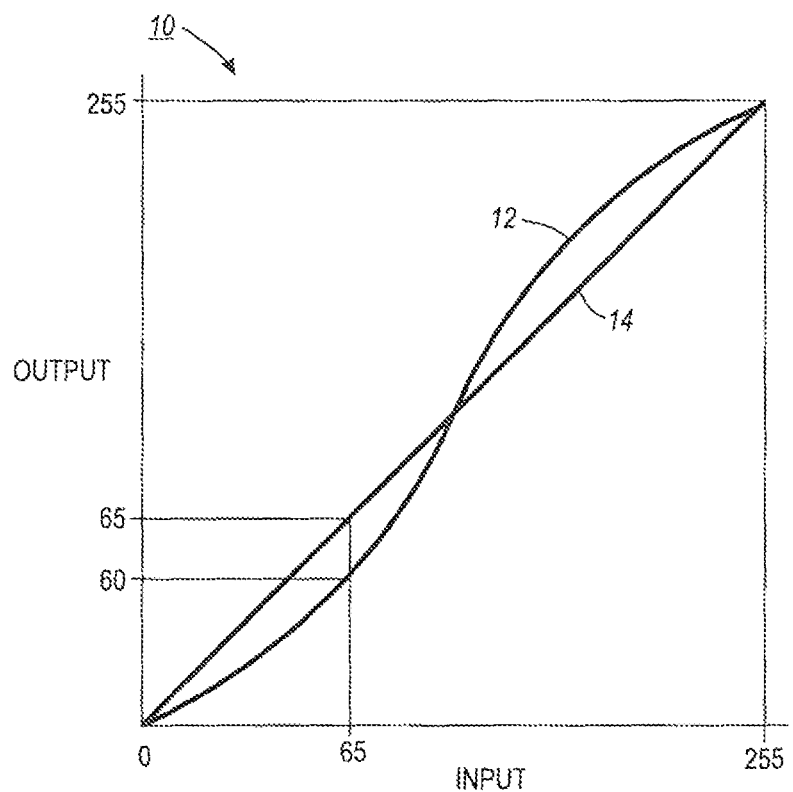
FIG. 1 is a graph depicting color correction of a printer output.

It should be noted that some details of the FIGS. have been simplified and are drawn to facilitate understanding of the present teachings rather than to maintain strict structural accuracy, detail, and scale.

DETAILED DESCRIPTION

Reference will now be made in detail to exemplary embodiments of the present teachings, examples of which are illustrated in the accompanying drawings. Wherever possible, the same reference numbers will be used throughout the drawings to refer to the same or like parts.

As used herein, unless otherwise specified, the word "printer" encompasses any apparatus that performs a print outputting function for any purpose, such as a digital copier, bookmaking machine, facsimile machine, a multi-function machine, electrostatographic device, etc.

As discussed above, colors on a printer tend to drift due to various factors such as color variations or ink viscosity variations in ink or toner, fluctuations in environmental conditions such as temperature and humidity, differences in the type of print media used, etc. When the drift is small, a calibration procedure may be performed on each color halftone to correct the drift to achieve color consistency. Using conventional methods, a customized linear color curve is produced for each color halftone. When a color halftone is printed, the customized linear color curve is used as a calibration TRC for that specific color halftone, and each color halftone uses its own customized calibration TRC. When printer drift requires recalibration, each color halftone must be printed and measured to create a plurality of new calibration TRC's, one for each color halftone.

In an embodiment of the present teachings, a simplified color profiling process may be performed that reduces the time and labor involved in profiling compared to some prior color profiling methods. In an embodiment, it may be assumed that the drift for each color results from the same source, for example environmental factors, and thus the resulting color drift will be similar for each color in the color pallet. Thus, to correct each color, a single unified TRC may be created based on a single default halftone or a single average linear color curve as described below, thereby eliminating the need to compare digital inputs and digital outputs for every color halftone in the color pallet. This simplified workflow eliminates the need for separate calibrations, one for each of a plurality of color halftones.

A system in accordance with the present teachings may thus include a print engine that utilizes process control to provide similar raw response between different halftones. A unified calibration TRC is created that may be based on the default (i.e., primary) color halftone and applied to all color halftones during printing. Thus unified calibration TRC is then received by the printer and applied to the destination profile for each color halftone during printing. During RIP, the unified calibration TRC is used for all halftone selections, while an automatic switching mechanism selects the corresponding destination profile based on the halftone selection. With small printer drift, a new calibration performed only on the primary halftone with the existing destination profiles will bring all halftone results back through the color management system. When re-profiling is required, user only needs to perform one calibration (performed on the primary halftone or average linear color curve) procedure prior to the profiling procedure for any halftone.

Figure 2:
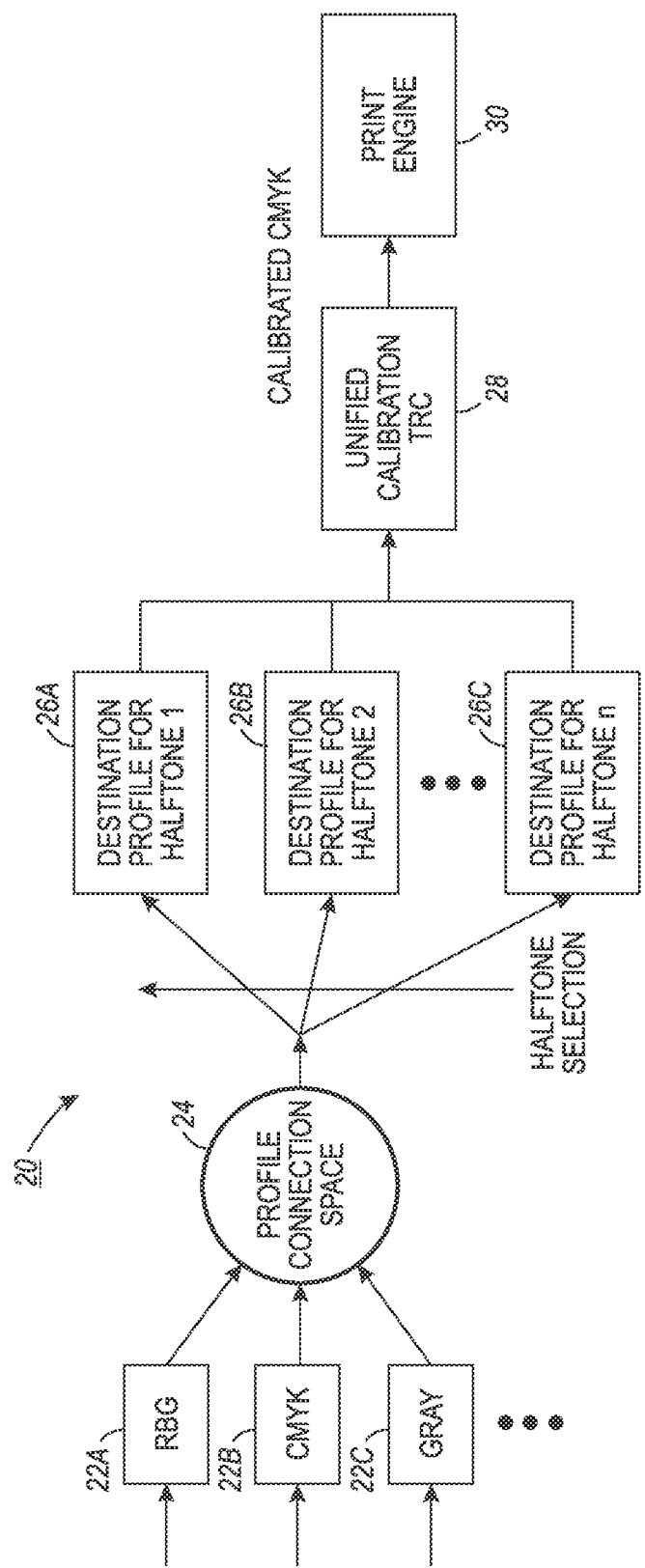
FIG. 2 is a block diagram depicting an embodiment of the present teachings.

An embodiment of the present teachings of a method for color management 20 for a printer (i.e., source device) is depicted in the block diagram of FIG. 2. In an embodiment, a printer includes a device-dependent color space or color model such as RGB 22A, CMYK 22B, grayscale 22C, etc. This device-dependent color data from the printer is translated into a device-independent profile connection space (PCS) 24 in accordance with international color consortium (ICC) specifications, for example using a lookup table. Translation may be performed by a color management module (CMM).

Once the color values of the source device have been converted to PCS 24, the CMM may transform the color values from the PCS 24 to a different device-dependent color space or destination profile 26A-26C, wherein each halftone includes a different destination profile 26.

Next, in contrast to some conventional color management processes that use a different calibration TRC for each halftone, an embodiment of the present teachings uses a single unified calibration TRC 28 for every color halftone. The unified calibration TRC 28 is used for correction of every color halftone with input from the destination profile 26A-26C for each color halftone, which is then passed to a print engine 30 for printing.

When a small drift occurs, the unified calibration TRC is recalibrated for the primary color halftone, then applied to the every color halftone during printing. Thus only one default color halftone requires calibration to create the unified calibration TRC 28, which is applied to correct all color halftones. For larger drifts or changes, the destination profiles themselves will require recalculation in accordance with known techniques.

Figure 3:
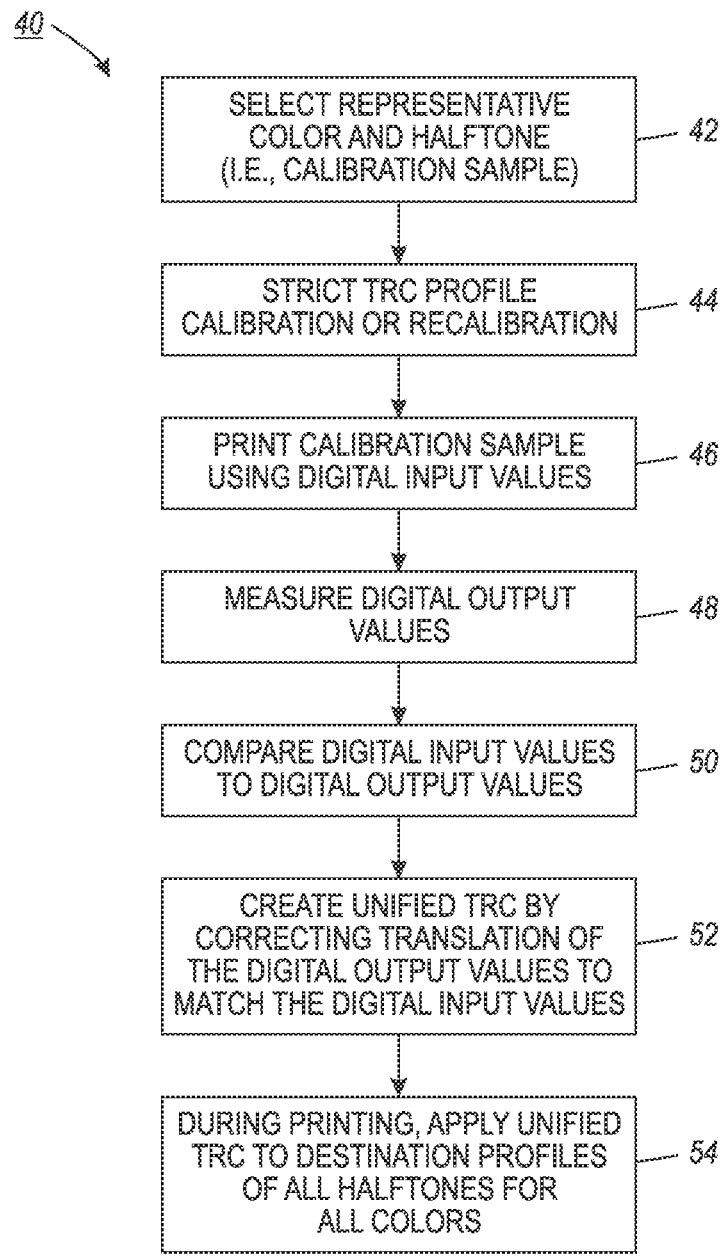
FIGS. 3 and 4 are flow charts depicting two different embodiments of the present teachings.

The unified calibration TRC 28 may be developed for a specific printer using any method. For example, in one method 40 as depicted in the flow chart of FIG. 3, a representative halftone (i.e., the default, primary, or middle halftone) for a representative color is selected 42 and used to calculate the unified calibration TRC 28. The representative color halftone (i.e., the "calibration sample") may be the one that is most commonly used with the particular printer output, or the one that has been measured and determined to provide the most average and representative drift changes. During initial TRC calibration, or when a printer drift occurs that requires the printer to be recalibrated, a calibration procedure is initialized 44 and may be performed as described above with reference to FIG. 1 for the calibration sample to create a linear color curve 14 for the calibration sample to provide the unified calibration TRC 28. For example, a plurality of the 0-255 digital input values (assuming an 8-bit system) for the calibration sample may be printed 46, and the resulting printed digital output value may be measured 48 and compared 50 to the digital input value. A translation value required to match the digital input with the digital output for each of the measured values from 0-255 for the calibration sample is used to form a linear color curve 14, which provides the unified calibration TRC 52, for example in a lookup table. Each of the pallet color halftones is then recalibrated 54 by applying the unified calibration TRC 28 to each destination profile 26, which the print engine 30 uses during printing. While the unified calibration TRC 28 may fully correlate to only the calibration sample and only partially correlate to the other color halftones, it is assumed the cause of the drift is similar for each color halftone and thus the approximation supplied by the unified calibration TRC is sufficient for a suitable print output. Since the destination profiles for the halftones other than the primary halftone are also built and correlated with the unified TRC, the colorimetric output will maintain its accuracy. When a subsequent printer drift occurs, the recalibration process begins again. Only the calibration sample requires manual or automatic measurement to create a new unified calibration TRC, thus saving operator labor and decreasing measurement time and reducing printer downtime.

Figure 4:
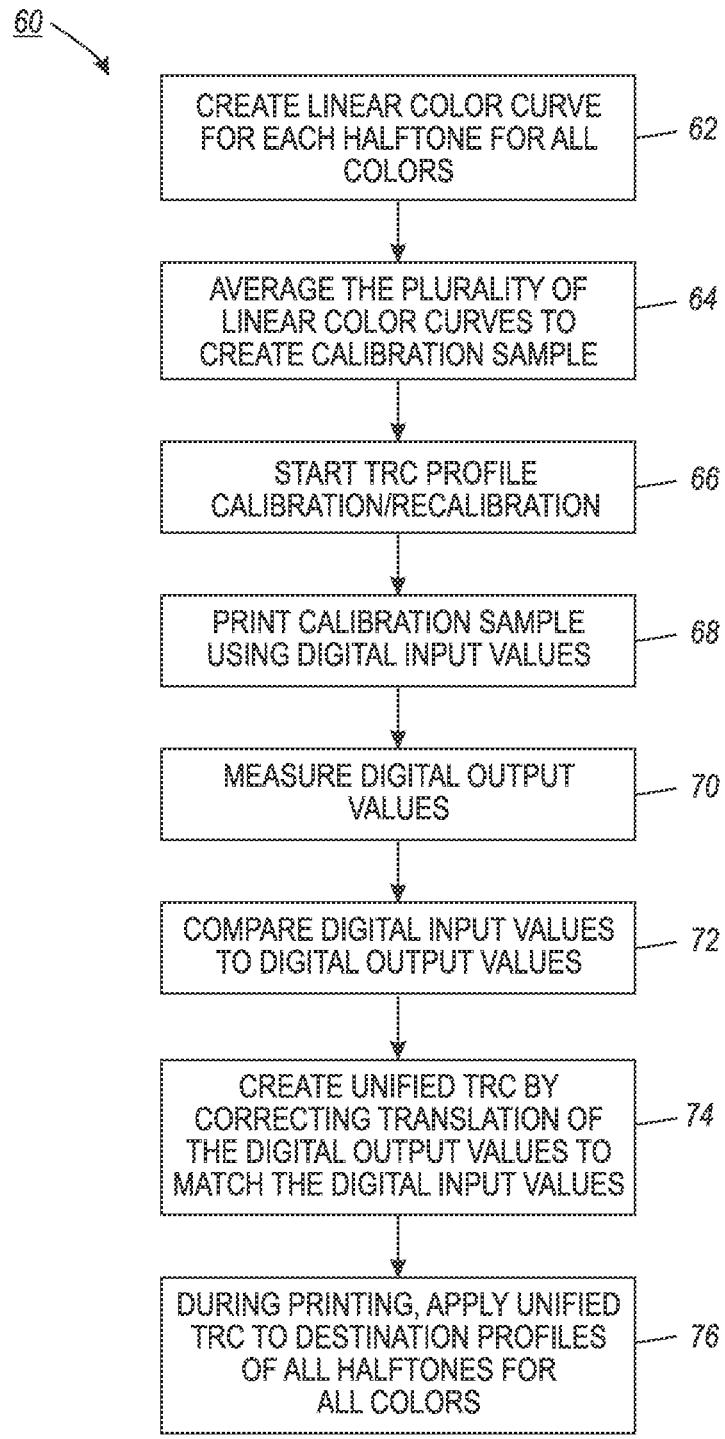

In another embodiment, the unified calibration TRC 28 may be created using an initial measurement of the average of all the halftones. In this embodiment 60 as depicted in FIG. 4, a linear color curve 14 is created for each color halftone 62, which results in a plurality of linear color curves 14. The plurality of linear color curves are then averaged 64 to create an average linear color curve 14 that is used to produce the unified calibration TRC. When a printer drift occurs that requires the printer to be recalibrated, a TRC profile recalibration is initialized 66, and a calibration sample is printed 68 as described above with reference to FIG. 1 using the digital input values 0-255 (assuming an 8-bit system). The digital output values are measured 70 and compared 72 with the digital input values. A translation value required to match the digital input with the digital output for each of the measured values from 0-255 for the calibration sample is used to form a linear color curve 14, which creates 74 the new unified calibration TRC 28. The unified calibration TRC 28 is applied to each destination profile 26, which the print engine 30 then uses during printing 76. In this embodiment, the unified calibration TRC 28 may not fully correlate to any of the color halftones but, since it is assumed the cause of the drift is similar for each halftone and thus to the average linear color curve, the approximation supplied by the unified calibration TRC is sufficient for a suitable print output. Note that the calibration samples for different halftones may be printed and samples may be measured all in one streamlined process. Because only the average linear color curve requires manual or automatic measurement and is applied to the destination profiles of all halftones, operator labor and measurement time are decreased, thus reducing printer downtime.

While the exemplary embodiments are illustrated and described above as a series of acts or events, it will be appreciated that the present teachings are not limited by the illustrated ordering of such acts or events. For example, some acts may occur in different orders and/or concurrently with other acts or events apart from those illustrated and/or described herein, in accordance with the present teachings. In addition, not all illustrated steps may be required to implement a methodology in accordance with the present teachings, and other steps can be added or modified. As another example, the averaging of the plurality of linear color curves 64 may be computed in a weighted formula.

When a larger printer drift occurs that cannot be resolved through recalibration of the unified calibration TRC 28, new destination profiles 26 for each color halftone must be created, for example in accordance with known techniques. However, the calibration step for a specific halftone, before each creation of the destination profile, is only needed one time, since the unified TRC has already been created, which will then be correlated with the newly generated destination profiles.

In general, different color characteristics from a printing device may be caused not only from using different halftones, but also from printing on different print media as well as other factors. It will be understood that the present teachings cover all such variations and are not limited to halftone variations, which will result in using different calibration TRCs and different destination profiles.

Figure 5:
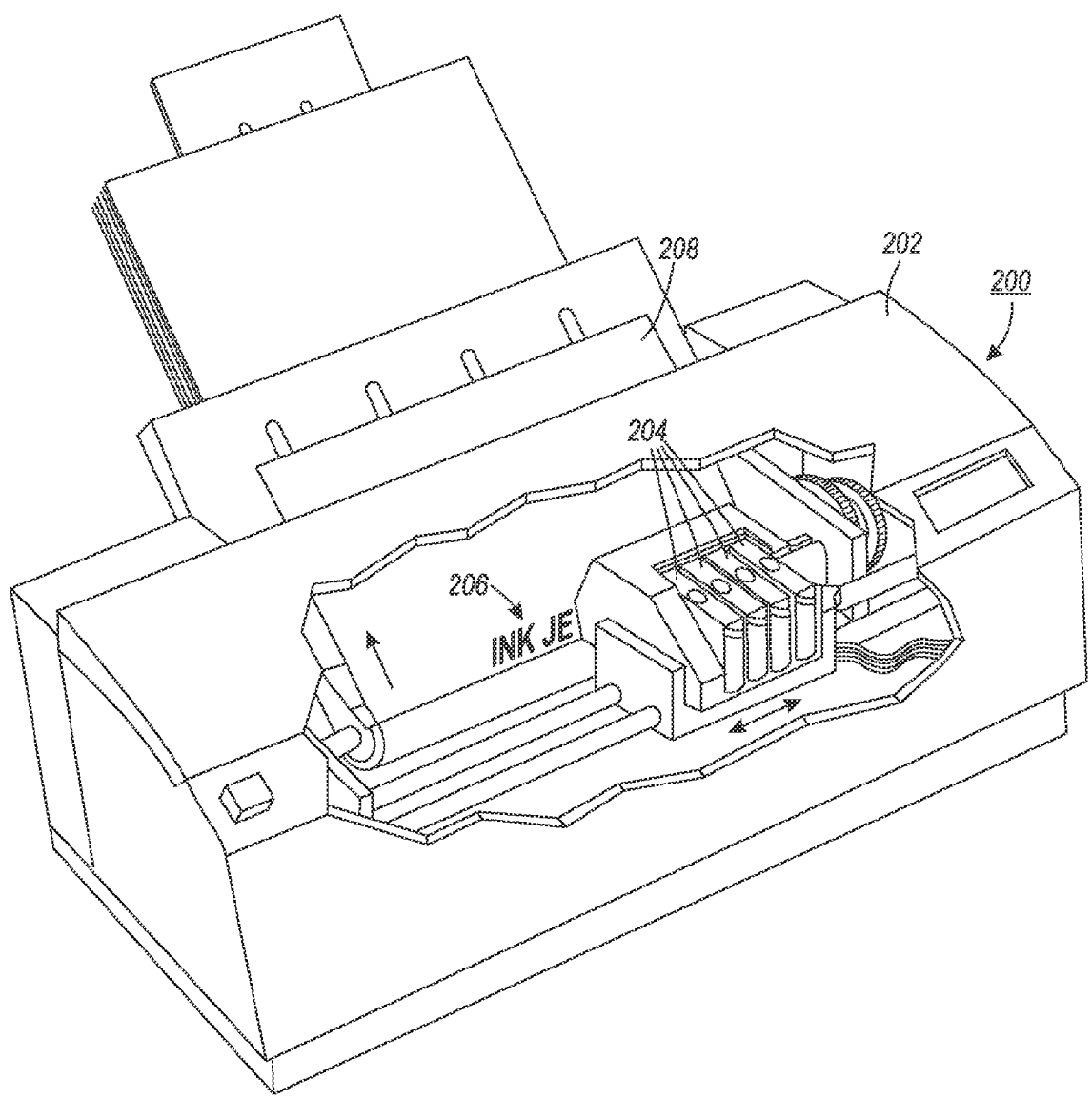
FIG. 5 is a perspective depicting of a printer including an embodiment of the present teachings.

FIG. 5 depicts a printer 200 that includes an embodiment of the present teachings. The printer 200 includes a printer housing 202 into which at least one printhead 204 has been installed and that encases the printhead 204. During operation, ink 206 is ejected from one or more printheads 204. The printhead 204 is operated in accordance with digital instructions to create a desired image on a print medium 208 such as a paper sheet, plastic, etc. The printhead 204 may move back and forth relative to the print medium 208 in a scanning motion to generate the printed image swath by swath. Alternately, the printhead 204 may be held fixed and the print medium 208 moved relative to it, creating an image as wide as the printhead 204 in a single pass. The printhead 204 can be narrower than, or as wide as, the print medium 208. In another embodiment, the printhead 204 can print to an intermediate surface such as a rotating drum or belt (not depicted for simplicity) for subsequent transfer of a solid or melted ink or toner to a print medium.

Figure 6:
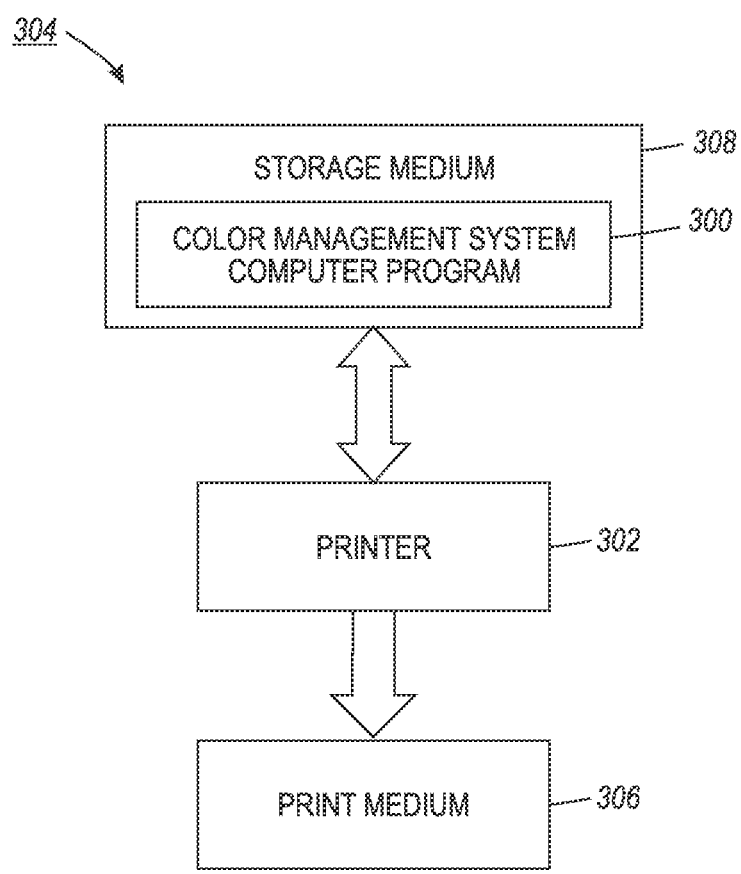
FIG. 6 is a schematic depiction of a color management system in accordance with an embodiment of the present teachings.

Certain embodiments of the present teachings may be performed as a computer program 300 internal and/or external to a color printer 302 to provide a color management system 304 for correcting a color output by the color printer 302 to, for example, a print medium 306 as depicted in FIG. 6. The program 300, when executed by a computer (for example a network computer or server) or the color printer itself 302, performs a method according to the present teachings. The computer program 300 may exist in a variety of forms, both active and inactive. For example, the computer program 300 can exist as software program(s), which can include program instructions in source code, object code, executable code, or other formats; firmware program (s); or hardware description language (HDL) files. Any of the above can be embodied on a non-transitory computer readable storage medium (i.e. storage device) 308. Exemplary computer readable storage devices 308 include conventional computer system RAM (random access memory), ROM (read-only memory), EPROM (erasable, programmable ROM), EEPROM (electrically erasable, programmable ROM), and magnetic or optical disks or tapes that may be internal and/or external to the printer 302. Exemplary computer readable signals, whether modulated using a carrier or not, may be signals that a computer system hosting or running an embodiment of the present teachings can be configured to access, including signals downloaded through the Internet or other networks. Concrete examples of the foregoing include distribution of executable software program(s) of the computer program on a CD-ROM or via Internet download. In a sense, the Internet itself, as an abstract entity, is a computer readable medium or storage device. The same is true of computer networks in general.

Notwithstanding that the numerical ranges and parameters setting forth the broad scope of the present teachings are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all sub-ranges subsumed therein. For example, a range of "less than 10" can include any and all sub-ranges between (and including) the minimum value of zero and the maximum value of 10, that is, any and all sub-ranges having a minimum value of equal to or greater than zero and a maximum value of equal to or less than 10, e.g., 1 to 5. In certain cases, the numerical values as stated for the parameter can take on negative values. In this case, the example value of range stated as "less than 10" can assume negative values, e.g. −1, −2, −3, −10, −20, −30, etc.

While the present teachings have been illustrated with respect to one or more implementations, alterations and/or modifications can be made to the illustrated examples without departing from the spirit and scope of the appended claims. For example, it will be appreciated that while the process is described as a series of acts or events, the present teachings are not limited by the ordering of such acts or events. Some acts may occur in different orders and/or concurrently with other acts or events apart from those described herein. Also, not all process stages may be required to implement a methodology in accordance with one or more aspects or embodiments of the present teachings. It will be appreciated that structural components and/or processing stages can be added or existing structural components and/or processing stages can be removed or modified. Further, one or more of the acts depicted herein may be carried out in one or more separate acts and/or phases. Furthermore, to the extent that the terms "including," "includes," "having," "has," "with," or variants thereof are used in either the detailed description and the claims, such terms are intended to be inclusive in a manner similar to the term "comprising." The term "at least one of" is used to mean one or more of the listed items can be selected. Further, in the discussion and claims herein, the term "on" used with respect to two materials, one "on" the other, means at least some contact between the materials, while "over" means the materials are in proximity, but possibly with one or more additional intervening materials such that contact is possible but not required. Neither "on" nor "over" implies any directionality as used herein. The term "about" indicates that the value listed may be somewhat altered, as long as the alteration does not result in nonconformance of the process or structure to the illustrated embodiment. Finally, "exemplary" indicates the description is used as an example, rather than implying that it is an ideal. Other embodiments of the present teachings will be apparent to those skilled in the art from consideration of the specification and practice of the disclosure herein. It is intended that the specification and examples be considered as exemplary only, with a true scope and spirit of the present teachings being indicated by the following claims.

The invention claimed is:

1. A method for color management for a color printer, comprising:
    selecting a representative color halftone as a calibration sample, wherein the representative color halftone includes only one color halftone;
    creating a single unified calibration tone reproduction curve (TRC) using only the representative color halftone;
    printing the calibration sample of the representative color halftone by using the single unified calibration TRC to convert digital input values of the single unified calibration TRC to printed digital output values;
    measuring the printed digital output values to provide measured printed digital output values;
    comparing the digital input values of the single unified calibration TRC to the measured printed digital output values to provide a comparison between the digital input values and the measured printed digital output values;
    creating, based on the comparison, a second unified calibration TRC including a second translation that converts a plurality of digital input values to a plurality of corrected digital output values;
    providing a plurality of color halftones including a first color halftone and a second color halftone, wherein the first color halftone and the second color halftone are different color halftones;
    correcting the first color halftone based on only the second unified calibration TRC by applying the second unified calibration TRC to a first destination profile for the first color halftone, thereby providing an output-corrected first color halftone; and
    correcting the second color halftone based on only the second unified calibration TRC by applying the second unified calibration TRC to a second destination profile for the second color halftone, thereby providing an output-corrected second color halftone.

2. The method of claim 1, wherein the representative color halftone is a primary color halftone.

3. The method of claim 1, wherein the first destination profile is a first device-dependent destination profile and the second destination profile is a second device-dependent destination profile, further comprising:
    translating a device-dependent color model into a device-independent profile connection space comprising a plurality of color values; and
    transforming the plurality of color values into the first device-dependent destination profile for the first color halftone and the second device-dependent destination profile for the second color halftone.

4. The method of claim 1, further comprising:
    passing the color corrected first color halftone to a print engine;
    passing the color corrected second color halftone to the print engine; and
    printing a color output onto a print medium.

5. The method of claim 1, further comprising:
    using a plurality of digital input values to print a color output for the representative color halftone;
    measuring the color output for the representative color halftone to produce a color output measurement;
    comparing the color output measurement to the plurality of digital input values;
    creating a plurality of translation values for the representative color halftone, wherein the plurality of translation values comprises a translation value for each digital input to correct the color output for the representative color halftone; and
    using the plurality of translation values as the single unified calibration TRC.

6. The method of claim 5, wherein the representative color halftone is the color halftone that is most commonly used with a color output of the color printer.

7. The method of claim 5, wherein the representative color halftone is the color halftone that provides a most average and representative color drift change during color drift of a plurality of color halftones.

8. A non-transitory computer readable storage medium having a program stored thereon to provide a color management system for correcting a color output for a color printer, wherein the program, when executed by the computer, performs a method comprising:

selecting a representative color halftone as a calibration sample, wherein the representative color halftone includes only one color halftone;

creating a single unified calibration tone reproduction curve (TRC) using only the representative color halftone;

printing the calibration sample of the representative color halftone by using the single unified calibration TRC to convert digital input values of the single unified calibration TRC to printed digital output values;

measuring the printed digital output values to provide measured printed digital output values;

comparing the digital input values of the single unified calibration TRC to the measured printed digital output values to provide a comparison between the digital input values and the measured printed digital output values;

creating, based on the comparison, a second unified calibration TRC including a second translation that converts a plurality of digital input values to a plurality of corrected digital output values;

providing a plurality of color halftones including a first color halftone and a second color halftone, wherein the first color halftone and the second color halftone are different color halftones;

correcting the first color halftone based on only the second unified calibration TRC by applying the second unified calibration TRC to a first destination profile for the first color halftone, thereby providing an output-corrected first color halftone; and correcting the second color halftone based on only the second unified calibration TRC by applying the second unified calibration TRC to a second destination profile for the second color halftone, thereby providing an output-corrected second color halftone.

9. The non-transitory computer readable storage medium of claim 8, wherein the representative color halftone is a primary color halftone.

10. The non-transitory computer readable storage medium of claim 8, wherein the first destination profile is a first device-dependent destination profile, the second destination profile is a second device-dependent destination profile, and the program, when executed by the computer, further comprises:

translating a device-dependent color model into a device-independent profile connection space comprising a plurality of color values; and transforming the plurality of color values into the first device-dependent destination profile for the first color halftone and the second device-dependent destination profile for the second color halftone.

11. The non-transitory computer readable storage medium of claim 8, wherein the program, when executed by the computer, further comprises:

passing the color corrected first color halftone to a print engine;

passing the color corrected second color halftone to the print engine; and printing a color output onto a print medium.

12. The non-transitory computer readable storage medium of claim 8, wherein the program, when executed by the computer, further comprises:

using a plurality of digital input values to print a color output for the representative color halftone;

measuring the color output for the representative color halftone to produce a color output measurement;

comparing the color output measurement to the plurality of digital input values;

creating a plurality of translation values for the representative color halftone, wherein the plurality of translation values comprises a translation value for each digital input to correct the color output for the representative color halftone, wherein the plurality of translation values; and using the plurality of translation values as the single unified calibration TRC.

13. The non-transitory computer readable storage medium of claim 12, wherein the program, when executed by the computer, further comprises selecting a representative color halftone that is most commonly used with a color output of the color printer.

14. The non-transitory computer readable storage medium of claim 12, wherein the program, when executed by the computer, further comprises selecting a representative color halftone that is the color halftone that provides a most average and representative color drift change during color drift of a plurality of color halftones.

* * * * *